United States Patent

[11] 3,630,796

[72] Inventors: Masami Yokozawa
Osaka;
Hitoo Iwasa, Toyonaka-shi; Iwao
Teramoto, Ibaragi-shi, all of Japan
[21] Appl. No. 735,784
[22] Filed June 10, 1968
[45] Patented Dec. 28, 1971
[73] Assignee Matsushita Electronics Corporation
Osaka, Japan
[32] Priority June 14, 1967
[33] Japan
[31] 42/38536

[54] PROCESS FOR FORMING A TITANIUM DIOXIDE FILM
5 Claims, 1 Drawing Fig.

[52] U.S. Cl. ........................................ 156/17, 156/13, 117/106 D
[51] Int. Cl. ........................................ H01l 7/00, H01l 7/50
[50] Field of Search ........................................ 156/17, 13; 117/106 D; 148/178

[56] References Cited
UNITED STATES PATENTS
2,805,965  9/1957  Robinson ................... 117/106 D
2,831,780  4/1958  Deyrup ...................... 117/106 D
3,472,689  10/1969  Scott ........................ 156/17 X Primary Examiner—Jacob H. Steinberg
Attorney—Stevens, Davis, Miller & Mosher ABSTRACT: A process for forming a titanium dioxide film which has recently been recognized to be useful for an insulating material for film capacitors and other electric circuit, by feeding a mixed gas of vapor of organo oxy titanium compound, oxygen and carrier gas to the surface of heated baseplate to grow an amorphouslike titanium dioxide film on said surface of baseplate, and if necessary, crystallizing said titanium dioxide film with a heat treatment in order to stabilize the film.

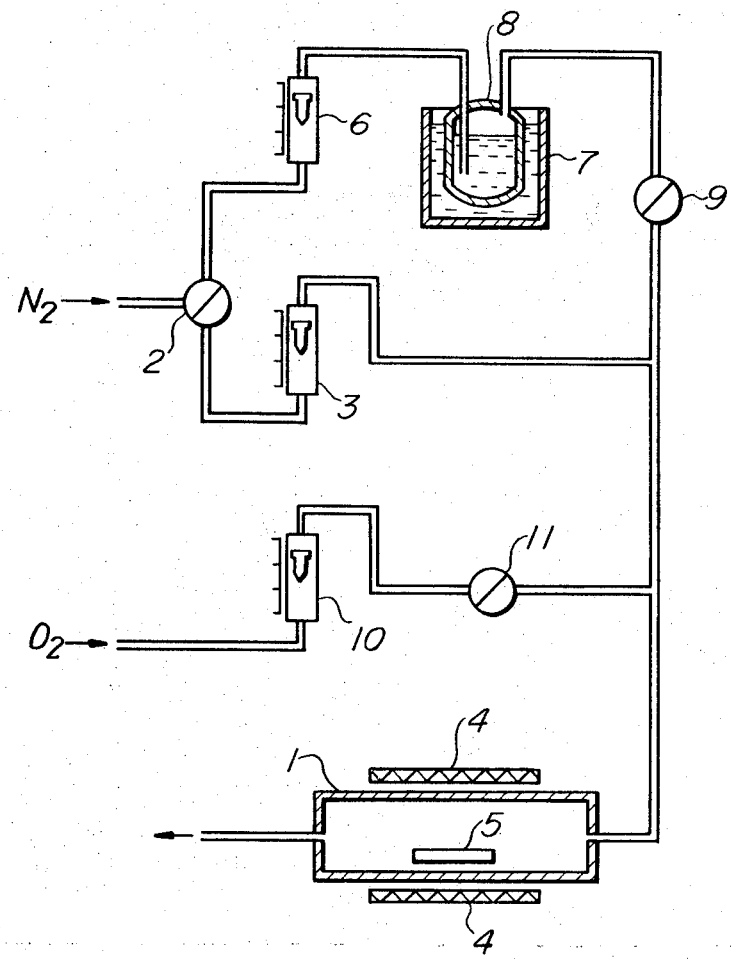
INVENTORS
MASAMI YOKOZAWA,
HITOO IWASA,
IWAO TERAMOTO,

PROCESS FOR FORMING A TITANIUM DIOXIDE FILM

The present invention relates to a process for forming a titanium dioxide film by the pyrolysis of an organo oxy titanium compound.

A titanium dioxide, having excellent electric properties capable of being utilized as an insulator and a dielectric, has been expected to be useful for a film capacitor for composite parts of electric circuit and the like.

As one of the processes for forming a titanium dioxide film ($TiO_2$), the process is widely and well known wherein a titanium is oxidized with a heat treatment at a high temperature of 1,400° C. or more. In this process, however, there are such drawbacks as that a baseplate is limited to a titanium metal and a utility is very poor due to the reasons of an extremely high-treating temperature and a lower growing velocity of titanium oxide.

Another process is also well known in which the titanium dioxide film is formed being separated out by the pyrolysis of titanium halide, for instance titanium tetra chloride ($TiCl_4$) in an atmosphere of oxygen. Also in this process, the treatment should be effected at a high temperature such as 700° C. or more. Moreover, the titanium dioxide thus produced provides a nonhomogeneous film containing two kinds of crystal form, i.e., rutile form and anatase form. Accordingly, the electric characteristics of titanium dioxide film formed have a wide distribution of value which leads to the difficulty of reproducing the characteristics desired.

Further, as the result of investigating the reduction of forming temperature of titanium dioxide film, there has been found the process in which a crystalline (rutile form) titanium dioxide was produced by pyrolyzing in vacuum an organo oxy titanium compound, for instance tetra ethyl titanate, tetra isopropyl titanate, furfuryl titanate and the like. Even in this process, the forming temperature of 400° C. or more is required and a nature of titanium dioxide film varies depending on the forming conditions. For instance to obtain the film consisting only of rutile form crystal structure, it is required to carry out the heat treatment at the temperature of 900° C. or more. Such being the case, there are involved the complicated problems industrially in the points of equipment processings.

Still further, a process is well known in which the titanium dioxide film is formed by hydrolyzing titanium tetra chloride or organo oxy titanium compound and spraying the resultant solution on the surface of base plate through nozzle. In such hydrolyzing process, the operation can be carried out at the low temperature of 150° C. or so, however, there is a lack of applicability to an industrial practice and the control of nature of film becomes difficult being mixed up with rutile form and anatase form.

As enumerated above, the prior processes for forming the titanium dioxide film had by any mean a common drawback such as a high-forming temperature or a ununiform nature of film and in addition a poor reappearance. A higher forming temperature has the films obtained by these processes crystalized and the films become too chemically stable to be etched without eroding a baseplate material. Further, the film in which two kinds or more of crystal forms are mixed varies depending upon the forming temperature, and in consequence the electric characteristics are not standardized, the solubility becomes ununiform and the processing treatment thereof is accompanied with some difficulties.

As explained hereinbefore, an industrially suitable process has not been present until now, and it has been desired in the manufacturing course of semiconductor device and the like to be provided with an easy process for forming an amorphous titanium dioxide film excellent in electric and chemical characteristics.

One of the objects of the present invention is to provide a process for forming an amorphous like titanium dioxide film industrially at a lower temperature which can be easily etched in an arbitrary shape.

Another object of the present invention is to provide a process for economically forming a crystallized titanium dioxide film with any desired pattern.

These and other objects and advantages of the present invention will become apparent to those skilled in the art from a consideration of the following specification and claims.

In accordance with the present invention, it has been found that the uniform and amorphous like titanium dioxide film which has not been obtained in any prior way can be formed at a higher growing velocity and a lower temperature as compared with those of the prior art by pyrolyzing a vapor of organo oxy titanium compound, for instance tetra isopropyl titanate, in an atmosphere containing oxygen. That is to say, in the process of the present invention, vaporizing with heating the organo oxy titanium compound at the specified temperature, feeding to a reaction chamber the vapor of said organo oxy titanium compound, oxygen and an inert gas comprising nitrogen or rare gas employed as the carrier gas, and reacting the foregoing organo oxy titanium compound with oxygen on the surface of base plate heated, there is formed the amorphous like titanium dioxide film.

Further, in another process of the present invention, etch-processing the titanium dioxide film formed in accordance with the aforedescribed process into the specified shape with a conventional etching agent and crystallizing the resultant processed film with the heat treatment, there is obtained the crystallized titanium dioxide film.

Hereinafter the explanation will be made for the worked example of the present invention on the basis of the drawing. Said drawing annexed hereto shows the outline of equipment employed for carrying out the present invention.

At first the atmosphere in a reaction chamber (1) is replaced sufficiently with a carrier gas, for instance nitrogen, fed through the first piping system provided with a stop cock (2) and a flow-meter (3). The base plate (5) is heated to the specified temperature ranging from 200° to 700° C. by means of a heating apparatus (4) such as infrared lamp, high frequency inductive heating apparatus or the like. Successively, said carrier gas is switched to the second piping system provided with a flow-meter (6) by turning the stop cock (2) and is fed to an evaporator (8) filled up with organo oxy titanium compound maintained at the specified temperature by a thermostat (7). The carrier gas is mixed with the saturated vapor of organo oxy titanium compound, and said mixed gas being continued its mixing is fed to the reaction chamber (1) through the regulation of a stop cock (9). Then by supplying the constant flow amount of oxygen to said reaction chamber from the third piping system provided with a flow-meter (10) through the regulation of a stop cock (11), the decomposition of the said organo oxy titanium compound proceeds and the forming velocity of titanium dioxide film is accelerated in the reaction chamber (1).

The efficacious organo oxy titanium compound used for the present invention includes, besides tetra isopropyl titanate, tetra ethyl titanate and furfuryl titanate.

The oxygen content in the reactant can widely be varied. However, in accordance with the increase of oxygen content, the growing velocity of titanium dioxide film is accelerated and on the other hand, the crystalline titanium dioxide is present being mixed into the amorphous film, and in consequence nonhomogeneous film is produced which leads to the poor reappearance of homogeneous film. Moreover there are increased the difficulties in handling and operation of equipment for the purpose of growing the titanium dioxide film therein.

According to the experimental results achieved by the inventors, the uniform and transparent glazed amorphous like film could be obtained and the adhesiveness to the baseplate was favorable, in case where the oxygen content in the reactant was selected within the range of 10 to 60 percent by mole or 0.1 to 0.6 by mole ratio.

On the baseplate of any kind of materials can be formed the titanium dioxide film providing that said baseplate would be heated to the temperature of 200° C. or more.

When the reaction temperature is raised over 700° C., there is a tendency of giving a crystal property to the nature of film due to the reason that the pyrolytic reaction becomes rather dominant than the effect of reactive acceleration of oxygen. Accordingly the effect of the present invention is conspicuous within the lower temperature range of 200° to 650° C.

The titanium dioxide film obtained under such an experimental condition was the transparent glazed film having the refractive index of 2.0 to 2.1, the dielectric constant of 85 to 90 and the etch rate of 35 A. per second with 1.8 normals hydrofluoric acid. It is remarkable that the film is soluble in dilute hydrofluoric acid. It makes the application of a conventional photoetching process possible to a titanium dioxide film. Further, said film is easily converted to the crystalline film when heated at a higher temperature in an atmosphere of nitrogen.

According to the experimental results, in case where the treating temperature is regulated below 900° C., the crystal structure of anatase form only can be obtained with good reproducibility, while in case of over 900° C. rutile form is always obtained. As in the prior processes, a crystal structure can not be controlled by the heating temperature during film formation. However, the separated heat treatment made it possible to form an optional crystal structure.

The amorphous titanium dioxide film has an easily etchable property but a fairly large dielectric loss. Such film properties, however, could be changed by the heat treatment to the crystalline one having small dielectric loss and etch-proof property.

The following examples are given merely as illustrative of the present invention and are not to be considered as limiting.

EXAMPLE 1

Placing titanium plate in the reaction chamber, the chamber was filled up in advance with nitrogen gas fed from the first piping system. Said titanium plate was heated by infra red lamp and maintained at 320° C. The saturated vapor of tetra isopropyl titanate maintained at the constant temperature of 75° C. by thermostat was mixed with nitrogen fed in the rate of 900 cc. per minute. To the resultant mixed gas was fed and mixed oxygen in the rate of 100 cc. per minute through the second piping system provided with a flow-meter. The reactant thus obtained was fed to the surface of the foregoing heated titanium plate to form the titanium dioxide film thereon at the growing velocity of 0.25 $\mu$ hour. The titanium dioxide film obtained was a transparent glazed film having the refractive index of 2.0 to 2.1, the dielectric constant of 85 to 90 and the etch rate of 35 A./sec. against the hydrofluoric acid of 1.8 normals.

EXAMPLE 2

Employing the same procedure as in case of the above example 1 but using silicon plate as the baseplate, the titanium dioxide film was formed on the surface of silicon plate at the same growing velocity as in case of titanium plate. The electric characteristics and the nature of the film obtained was just the same as those of the example 1.

EXAMPLE 3

Employing the same manner as in case of the above example 1, nitrogen was fed and mixed to tetra ethyl titanate at the rate of 400 cc. per minute, and oxygen was fed and added to the resultant mixture at the rate of 600 cc. per minute to prepare a reactant. Said reactant was fed to germanium plate coated with a thin silicon dioxide film heated and maintained at the temperature of 320° C. to form the titanium dioxide film on the surface of said base plate at the growing velocity of 3 $\mu$ hour. The properties of this film were same as those of the example 1.

EXAMPLE 4

Employing the same manner as in case of the above example 3 but using silicon as the base plate heated and maintained at the temperature of 210° C., there was formed at the growing velocity of 1 $\mu$ hour the titanium dioxide film. The characteristics and nature of this film were same as in case of those of the example 1. The film was then heat-treated at the temperature ranging of 460° C. to 980° C.

Treating temperature and nature of film are shown in the following table.

TABLE

| Treating temperature (° C.) | Treating hour | Dielectric constant | Coefficient of dielectric loss | Refractive index | Etch rate with 1.8 N hydrofluoric acid, A/.sec. | Nature of film |
|---|---|---|---|---|---|---|
| Nontreatment | | 85–90 | 0.055–0.065 | 2.0–2.1 | 35 | Amorphous |
| 460 | 1 | 60 | 0.045 | 2.05–2.08 | 0 | Amatase. |
| 630 | 1 | 30 | 0.045 | 2.08–2.1 | 0 | Do. |
| 630 | 3 | 25 | 0.035 | 2.12–2.14 | 0 | Do. |
| 800 | 1 | 25 | 0.025 | 2.13–2.14 | 0 | Do. |
| 800 | 3 | 20 | 0.025 | 2.14–2.2 | 0 | Do. |
| 980 | 1 | 20 | 0.020 | 2.33–2.38 | 0 | Rutile. |
| 980 | 3 | 20 | 0.015 | 2.40–2.47 | 0 | Do. |

As explained above, in accordance with the present invention, it has become possible to form the titanium dioxide film from the organo oxy titanium compound even at the lower temperature range and at the higher growing velocity. In addition, the titanium dioxide film thus formed is an amorphous film having a good adhesiveness to the baseplate as well as having an easiness of chemical etching as compared with the crystalline titanium dioxide film. Furthermore, the following heat treatment makes it possible to form an optical crystal structure and to improve the film properties. The $TiO_2$ film thus heat-treated cannot be etched anyway. The product is very much efficacious at the time of utilization under the combination with the photoetching technique usually employed in the course of manufacturing the semiconductor device.

The present invention being thus described, it will be obvious that the same may be varied in many ways. Such variations are not to be regarded as a departure from the spirit and scope of the present invention, and all such modification are intended to be included within the scope of the following claims.

I claim:

1. A process for forming a titanium dioxide film having a desired shape on the surface of a baseplate comprising
   a. vaporizing with heating an organo oxy titanium compound,
   b. introducing a mixture of oxygen and an inert gas into admixture with said compound said mixture containing 10 to 60 mol percent of oxygen as a carrier gas to form a reaction gas,
   C. contacting the heated surface of said baseplate with said reaction gas to allow an amorphous titanium dioxide film to form on said surface of said baseplate,
   d. etch processing said film with an etchant to the desired shape, and
   e. crystallizing same by heat treatment.

2. The process of claim 1, wherein said etchant contains hydrofluoric acid.

3. The process of claim 1, wherein said carrier gas comprises nitrogen and a rare gas.

4. The process of claim 1 wherein said organo oxy tin compound is tetra-isopropyl titanate, tetra-ethyl titanate, or furfuryl titanate.

5. The process of claim 1 wherein said baseplate is heated to 200° to 700° C.

* * * * *

UNITED STATES PATENT OFFICE
CERTIFICATE OF CORRECTION

Patent No. 3,630,796    Dated December 28, 1971

Inventor(s) Masami YOKOZAWA et al

It is certified that error appears in the above-identified patent and that said Letters Patent are hereby corrected as shown below:

One of the two Japanese applications is missing from the Claim from Convention Priority and should be listed as follows:

--Japan, Patent Appln. N° 42/38537 filed June 14, 1967--.

Signed and sealed this 6th day of June 1972.

(SEAL)
Attest:

EDWARD M. FLETCHER, JR.
Attesting Officer

ROBERT GOTTSCHALK
Commissioner of Patents